United States Patent
Poulin

(10) Patent No.: US 7,861,501 B2
(45) Date of Patent: Jan. 4, 2011

(54) METHOD AND APPARATUS FOR APPLYING FLEXIBLE SLEEVING

(75) Inventor: Christopher J. Poulin, Carmel, NY (US)

(73) Assignee: BTX Technologies, Inc., Hawthorne, NY (US)

( * ) Notice: Subject to any disclaimer, the term of this patent is extended or adjusted under 35 U.S.C. 154(b) by 139 days.

(21) Appl. No.: 12/118,699

(22) Filed: May 10, 2008

(65) Prior Publication Data
US 2009/0277344 A1    Nov. 12, 2009

(51) Int. Cl.
*B65B 27/06* (2006.01)
(52) U.S. Cl. .............................. 53/580; 53/397; 53/585; 174/128.2
(58) Field of Classification Search ............... 53/397, 53/580, 582, 585; 174/102 R, 128.2; 385/86, 385/136
See application file for complete search history.

(56) References Cited

U.S. PATENT DOCUMENTS

| | | | |
|---|---|---|---|
| 4,844,762 A * | 7/1989 | Schroder | 156/244.12 |
| 4,934,662 A * | 6/1990 | Griffioen et al. | 254/134.4 |
| 5,600,098 A * | 2/1997 | Kazaks | 174/135 |
| 5,699,996 A * | 12/1997 | Boyle et al. | 254/134.4 |
| 5,796,045 A * | 8/1998 | Lancien et al. | 174/109 |
| 5,884,384 A * | 3/1999 | Griffioen | 29/468 |
| 6,179,269 B1 * | 1/2001 | Kobylinski | 254/134.3 R |
| 6,523,584 B1 * | 2/2003 | Rehrig | 150/154 |
| 6,543,094 B2 * | 4/2003 | D'Addario | 24/16 PB |
| 6,705,002 B1 * | 3/2004 | Dukes et al. | 29/825 |
| 6,809,266 B1 * | 10/2004 | Hoi et al. | 174/135 |
| 2007/0053646 A1 * | 3/2007 | Kendricks | 385/136 |

\* cited by examiner

*Primary Examiner*—Thanh K Truong
(74) *Attorney, Agent, or Firm*—Leason Ellis LLP

(57) ABSTRACT

In one embodiment, an apparatus for applying a flexible, expandable sleeving over an elongated structure includes a first area for receiving the member and an elongated hollow conduit that receives the elongated structure within a hollow interior space thereof. The expandable sleeving is compressed and bunched and held in compression along an outer surface of the conduit. The apparatus also includes a second area that includes a pair of rollers that are disposed about one end of the conduit and are configured so that they contact the sleeving as it is paid out onto an outside of the elongated structure and prevent the compressed sleeving from suddenly releasing its stored energy and self-ejecting off of the conduit as the sleeving and bundle are mated and are moved away from the rollers.

19 Claims, 7 Drawing Sheets

METHOD AND APPARATUS FOR APPLYING FLEXIBLE SLEEVING

TECHNICAL FIELD

The present invention relates to an apparatus and method for applying sleeving materials to wire, cable, hose, tubing, flexible actuators or like materials and bundles thereof. Most commonly, the sleeving is of an expandable type, such as braided nylon sleeving. However, the present invention can also accommodate other materials, such as shrinkable and non-shrinkable flexible tubing or sleeving, as well as many other types of flexible sleeving materials.

BACKGROUND

In all industries involving equipment where electrical signals, power, fluids, air, actuation or other substance or energy transference is required, so are wires, cables, hoses, tubing, flexible actuators and like materials and devices required. In many of these applications it is desirable to bundle these materials together or to apply a protective outer surface or to apply a decorative surface as shown in FIG. 1. For instance, management of multiple wires or cables, protection against abrasion or temperature on a single hose, to facilitate efficient installation where these items would otherwise have to be installed one at a time and many other reasons. A cable harness in an automobile is an excellent example of this use. One common method of bundling these materials together is to apply a braided, expandable, flexible sleeve, often referred to as expando or flexo sleeving although other materials can be used such as shrinkable tubing.

The nature of the braided sleeving arrangement is such that when the tube is compressed axially, the diameter of the sleeve expands proportionally. This expanding property allows the braided sleeve to be applied over materials such as cable and cable bundles, hoses and bundles of hoses and other like materials.

Currently, the most common method of applying braided expandable flexible sleeving to a cable, or cable bundle is to manually compress the sleeving by hand, insert the cable or cable bundle into the expanded end, and slide the sleeving over the cable or cable bundle. As mentioned above, as the flexible sleeving is axial compressed, the diameter of the sleeving increases proportionally. This process is repeated over and over until the cable or cable bundle is fully encased in the sleeving. This technique is satisfactory for short lengths of cable and cable that has some degree of stiffness to it. However when using this technique to apply sleeving to long lengths of cable or to cable that is very limp in nature, such as cables that use very low durometer insulation and jacketing materials, the application becomes problematic and in some instances close to impossible. This is especially true when you combine the long length and limp cable characteristics and is exacerbated Per when multiples of long length, limp cables are to be bundled together.

A further complication is the ratio of the diameter of the cable or cable bundle to the nominal diameter of the sleeving. The closer the ratio is to one, the harder it is to apply. Conversely, the closer the final ratio is to one, the tighter or smoother the final assembly is. This tight fit is desirable in many instances such as when appearance is important or when the cable or cable bundle must be pulled through walls or equipment without getting caught on other devices or equipment. So the two factors work against each other. The best appearing, easiest to run assembly is the hardest to make.

Another difficulty in applying long lengths of sleeving to long lengths of cable is space. Because applying sleeving in the traditional method is essentially the same as sliding it onto the cable in the same way a knife is slid into a sheath, the space required would be equal to the final length needed. For instance, if you desire to bundle one hundred feet of cable, you would need a one hundred foot straight line in order to apply the sleeving effectively. Applying sleeving in the traditional method is also very time consuming due the fact that only a small amount of the sleeving can be compressed at any one time.

Alternatively, there are machines that directly braid the sleeve onto the bundle; however, these machines are very costly and are not portable since they are large, fixed machines. In addition, this type of machine requires highly skilled personnel to run them and all of the final configurations of cable combinations must be set at the time of braiding. This method of directly braiding onto the bundle requires large minimum quantities, which affects the supplier's flexibility to the customer's application and detrimentally lowers delivery response time. This is unsatisfactory since flexibility and response time are required in today's marketplace.

Consequently, there is an unfilled need in all industries that employ these types of sleeving for a means to cost-effectively, efficiently, easily and reliably apply sleeving to a wide variety of materials such as cable.

SUMMARY

The present invention provides a solution to the need in industry for an apparatus and method for cost-effectively, efficiently, easily and reliably applying sleeving to individual or bundles of wires, cables, hoses, tubing, flexible actuators and like materials and devices.

In one embodiment, an apparatus for applying a flexible, expandable sleeving over an elongated structure includes a first area for receiving the member and an elongated hollow conduit that receives the elongated structure within a hollow interior space thereof. The expandable sleeving is compressed and bunched and held in compression along an outer surface of the conduit. The apparatus also includes a second area that includes a pair of rollers that are disposed about one end of the conduit and are configured so that they contact the sleeving as it is paid out onto an outside of the elongated structure and prevent the compressed sleeving from suddenly releasing its stored energy and self-ejecting off of the conduit as the sleeving and bundle are mated and are moved away from the rollers.

According to an exemplary embodiment, an apparatus includes a rigid tube (conduit or elongated structure) fastened to a mounting flange. The mounting flange includes a tube adapter with a funnel shaped inlet where materials such as cable and cable bundles would enter the apparatus. The rigid tube/mounting flange assembly is in turn fastened to an end plate and the end plate would be fastened to a workbench or other horizontal surface to hold the tube/mounting flange assembly horizontally. The apparatus further includes a roller assembly at the end opposite the end plate. There are two rollers in the roller assembly each in a horizontal plane on either side of the rigid tube. The rollers have a V groove shape on their diametric face allowing the rigid tube to be located in an exact position. The rollers are fastened to a bracket with screw slots allowing adjustment to accommodate different sized rigid tubes. The bracket with the rollers fasted to it is in turn mounted to the same workbench or other horizontal surface as the end plate mentioned above. The distance of the roller assembly from end plate are dependent upon the length of the rigid tube which can be varied.

The apparatus works by storing axially compressed braided flexible sleeving on the outside of rigid tube. Different sized rigid tubes can be used so that different diameters of sleeving can be used. Selecting a tube that is close to the nominal diameter of the sleeving allows the sleeving to be stored on the tube in an axially compressed and expanded state. Since the sleeving is axially compressed, it is, of course, storing the spring energy of the sleeving. The adjustable roller assembly will prevent the sleeving from self ejecting off of the end of the rigid tube. The adjustable roller assembly also regulates the speed at which the sleeving is released by creating a slight friction on the sleeving so that it is evenly applied to the cable. Cable or a bundle of cables is inserted into the funnel shaped inlet opposite the roller assembly and brought through the inside of the rigid tube. Once the cable reaches the other end of the tube and meets the stored sleeving, both the sleeving and the cable or cable bundle are simultaneously pulled out of and off of the tube. The result is a cable or cable bundle being smoothly encased in the sleeving.

Another embodiment can include a spring-loaded pivoting self-adjusting roller assembly for regulation of sleeving payout from the apparatus.

Another embodiment can include a motorized adjustable roller assembly to facilitate the loading of sleeving onto the rigid tube.

Another embodiment can include a spring-loaded shuttle that facilitates sleeving payout from the rigid tube.

BRIEF DESCRIPTION OF DRAWING FIGURES

DETAILED DESCRIPTION OF EMBODIMENTS

The present invention provides a solution to the need in industry for an apparatus and method for cost-effectively, efficiently, easily and reliably applying sleeving to individual or bundles of wires, cables, hoses, tubing, flexible actuators and like materials and devices (hereinafter simply referred to as a "bundle" for ease of discussion). It will be understood that the apparatus is not limited to being used with a plurality of items that are bundled but instead, the sleeving can be applied to an individual wire, cable, etc., and thus the term bundle is not limited to being a combination of a plurality of items.

As described below in detail, the present invention is an apparatus that expands the diameter of sleeving and holds the expanded sleeving in great length. The sleeving is held in such away that the bundle can be pulled axially through the expanded sleeving. The sleeving is then paid out onto the outside of the bundle in a very easy, rapid fashion. The present apparatus has the ability to cut work time to create the assembly (the bundle and sleeving) to a single digit percentage of the time it takes to manually apply the sleeving. Currently, the manual method is the predominant method to apply the finished sleeving to a bundle; however, as described above, it suffers from a number of deficiencies. Advantageously, the apparatus of the present invention allows for instant configuration and has no minimums in terms of sleeving and the bundle.

Figure 1:
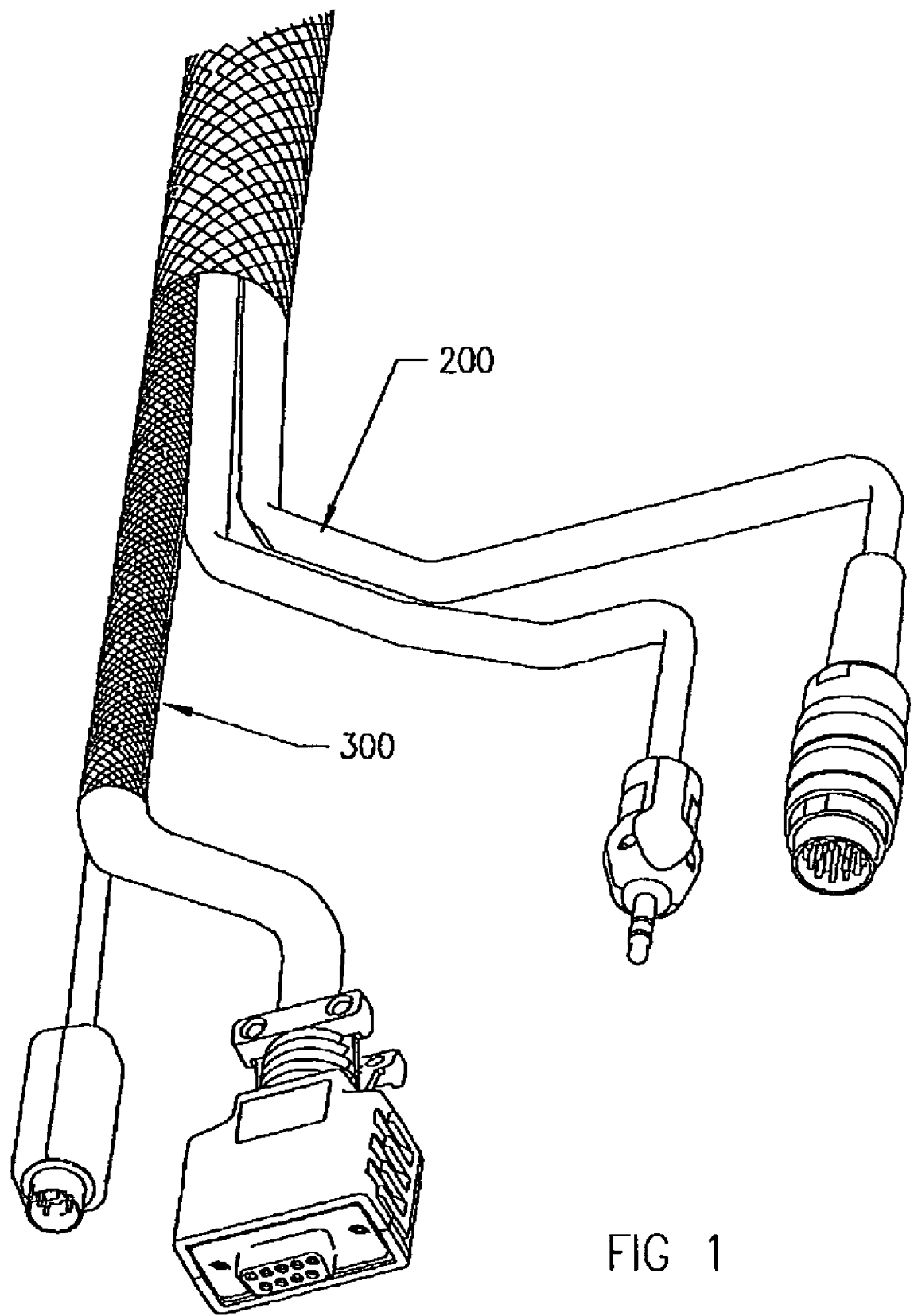
FIG. 1 is a perspective view of commonly available flexible expandable braided sleeving in use on several different cable bundles that are in turn all bundled together.
Figure 2:
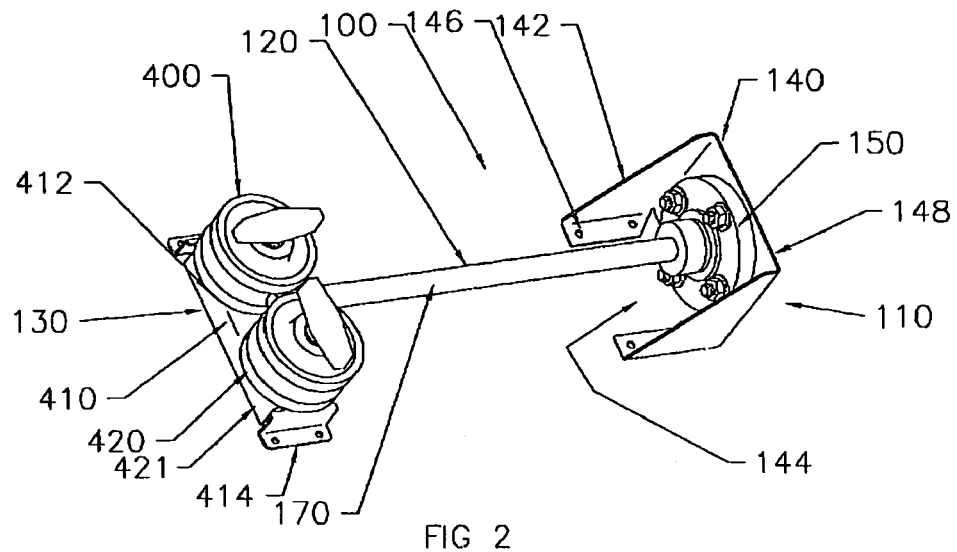
FIG. 2 is a perspective view of an apparatus according to one exemplary embodiment of the present invention.
Figure 3:
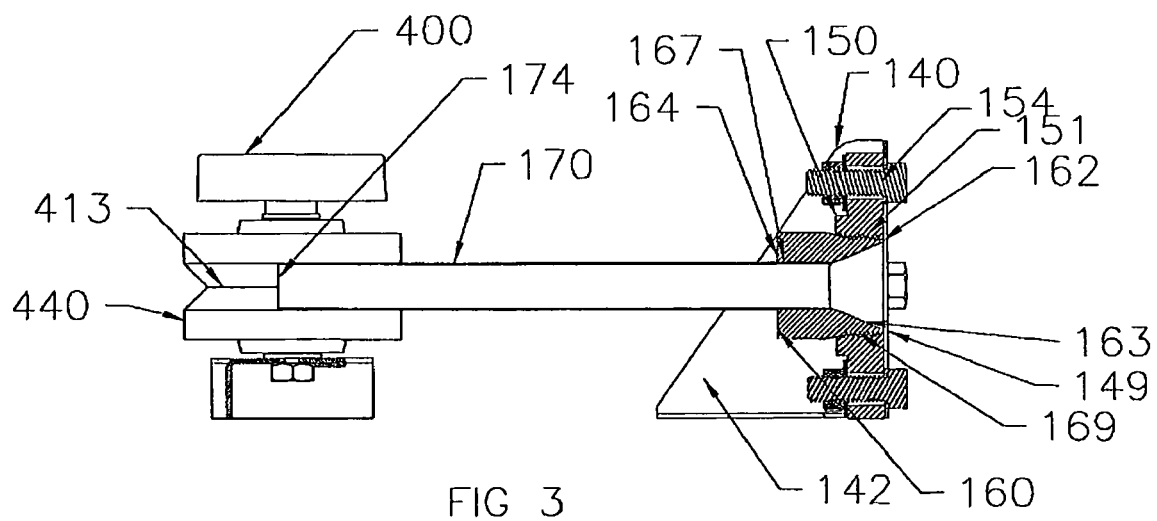
FIG. 3 is a side view cross section of an apparatus according to one exemplary embodiment of the invention for applying sleeving to a cable, cable bundles, etc.

FIG. 2 is a perspective view of one exemplary apparatus 100 according to the present invention for applying a flexible sleeving 300 to a member 200. FIG. 3 is a cross-sectional view of the apparatus 100. The apparatus 100 is formed of a number of components that are assembled together to provide a device that offers superior performance in terms in applying the sleeving 300 (FIG. 1) to the member 200 (FIG. 1). As mentioned above, the member 200 can be a wire, cable, hose, tubing, flexible actuators or like materials and bundles thereof. The sleeving 300 is typically of an expandable type, such as braided nylon sleeving, or it can be shrinkable and non-shrinkable flexible tubing or sleeving, as well as many other types of flexible sleeving materials.

Figure 6:
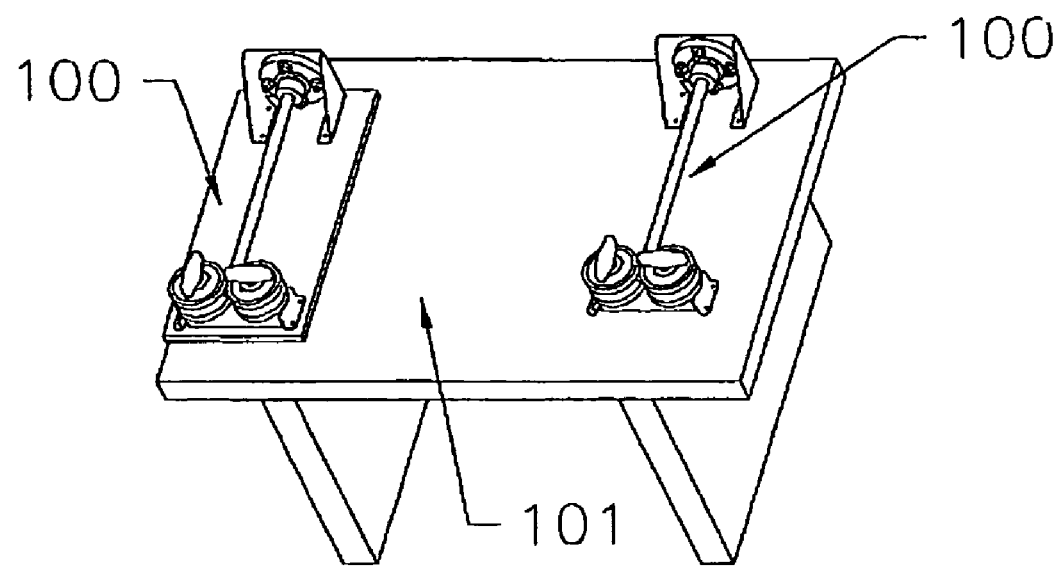
FIG. 6 is a perspective view of the apparatus being mounted in two different manners, namely, being mounted directly to a work bench or being mounted to a simple wooden board that is in turn clamped to the workbench.

As shown in FIGS. 2 and 3, the apparatus 100 generally includes a cable/bundle input area 110, an intermediate area 120 where the sleeving 300 is forced to bunch up into its expanded condition, and a cable/bundle output (exit) area 130. The input area 110 includes an end plate or mounting bracket 140 that allows the apparatus to be mounted to a substrate, see FIG. 6. In the illustrated embodiment, the end plate 140 includes a pair of side walls 142 that are spaced apart from one another such that a space 144 is formed therebetween. The side walls 142 can have any number of different shapes and are constructed to be mounted to the substrate along one edge 146 thereof. In FIGS. 1 and 6, the edge 146 is a bottom edge that includes openings that receive fasteners for mounting the apparatus 100 to the support surface. While the illustrated side walls 142 have triangular shapes, it will be understood that the side walls 142 can have any number of different shapes, including square, rectangular, etc. The end plate 140 also includes an end wall 148 that extends between the side walls 142.

The end plate 140 can be formed of any number of different materials, including metals and rigid plastics.

Figure 4:
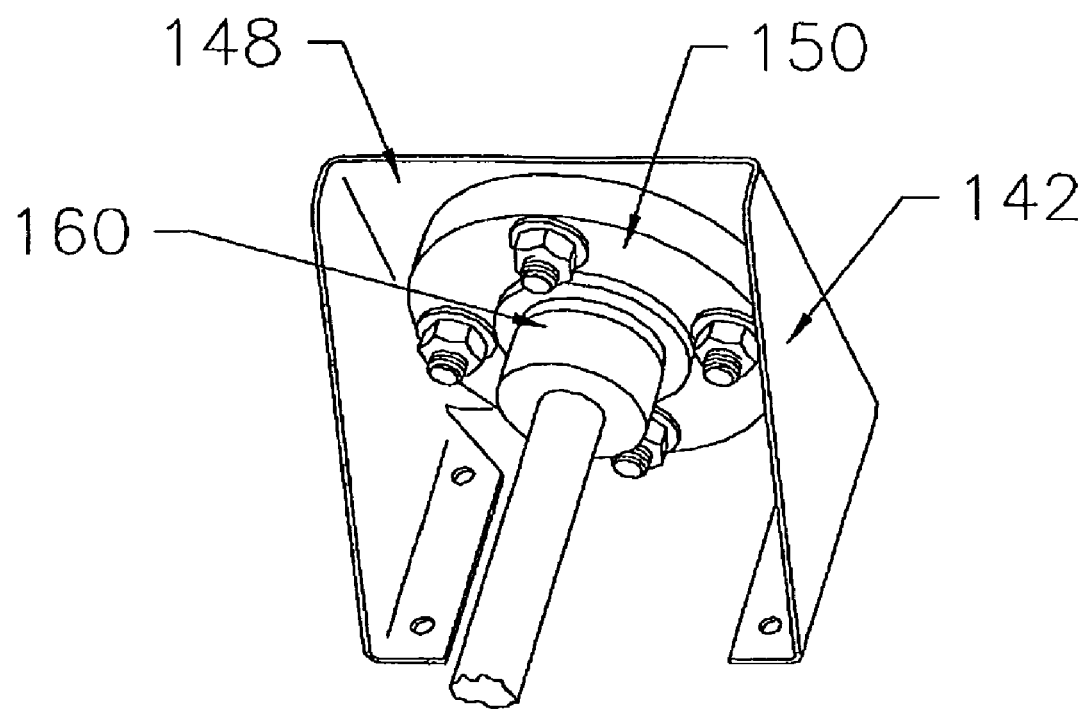
FIG. 4 is a perspective view of an end plate, mounting flange and conduit of the apparatus.

As shown in FIGS. 2-4, the input area 110 also includes a mounting flange 150 that is securely attached to an inner surface 149 of the end wall 148. As described below, the end wall 148 has an opening through which the bundle 200 is fed through as part of the overall process for applying the flexible sleeving 300 to the member 200. The mounting flange 150 includes an opening 151 that is axially aligned with the opening in the end wall 148. The mounting flange 150 can come in any number of different shapes and configurations and the opening formed within the flange 150 can be selected in view of a particular given application. In the illustrated embodiment, the flange 150 has a circular shape that includes a number of mounting holes 152 formed therein that are aligned with complementary and corresponding mounting holes formed in the end wall 148 to allow fasteners 154 to extend through the aligned mounting holes for attaching the mounting flange 150 to the inner surface 149 of the end wall 148. The illustrated fasteners 154 are in the form of threaded bolts or the like that allow the mounting flange 150 to be detachably mounted to the end wall 148. In the illustrated embodiment, there are four fasteners 154 spaced circumferentially about the flange 150.

The input area 110 also includes an inlet member or adapter 160 that is coupled to the mounting flange 150. The adapter 160 has a first end 162 that faces the inner surface 149 and a second end 164 that faces away from the inner surface 149 toward the intermediate area 120. The adapter 160 can be in the shape of a collar or the like in that it includes a central opening 161 that is axially aligned with the central openings formed in the flange 150 and end wall 148. The central opening 161 is not of a constant diameter from the first end 162 to the second end 164 but rather it has a variable diameter. More specifically, the central opening 161 is inwardly tapered 163 from the first end 162 toward the second end 164. The tapered section 163 thus has a greater diameter at the interface between the inlet member 160 and the flange 150 since it is configured to have conical or funnel shape to permit a cable or bundle to be easily received and focused as it is fed through the input area 110. The tapered section 163 terminates at a location where the diameter of the central opening 161 becomes constant (reduced diameter section 167) from this location to the second end 164. This construction is best shown in FIG. 3.

An outer surface of the adapter 160 has a coupling element or feature 165 that permits the adapter 160 to be detachably coupled to the mounting flange 150. For example, the coupling element 165 can be in the form of threads that are formed on the outside of the adapter 160 near and at the first end 162 thereof. The opening 151 of the mounting flange 150 includes complementary threads that engage the threads 165 of the adapter 160 causing the adapter 160 to be securely attached to the mounting flange 150. Thus, the adapter 160 can be simply screwed into the central opening 151 of the mounting flange 150.

The intermediate (sleeve storage) area 120 is defined by an elongated conduit (hollow tube) 170 that has a first end 172 and an opposite second end 174. The first end 172 is mated with the central opening 161 of the inlet member 160 and in particular, is disposed within the reduced diameter section 167 of the central opening 161 as shown in FIG. 2. Set screws positioned at 120 degrees from each other in adapter 160 creates a mechanical attachment to the first end 172. The tapered section 163 thus funnels the bundle 200 that is fed therein into the hollow first end 172 of the elongated conduit 170. In another embodiment, instead of being inserted and frictionally held within the adapter 160, the collar-like adapter 160 can be integral relative to the elongated conduit 170 or permanently attached thereto. In this case, the adapter 160 and attached conduit 170 are coupled in combination to the mounting flange 150.

The second end 174 of the conduit 170 is a straight cutoff butt tube end since the second end 174 serves as the bundle 200 exit end. This exit end 174 is the point where the sleeving 300 and bundle 200 meet and are immediately mated together.

The elongated conduit 170 can be formed from any number of different types of materials, including a metal or a rigid plastic.

Figure 5:
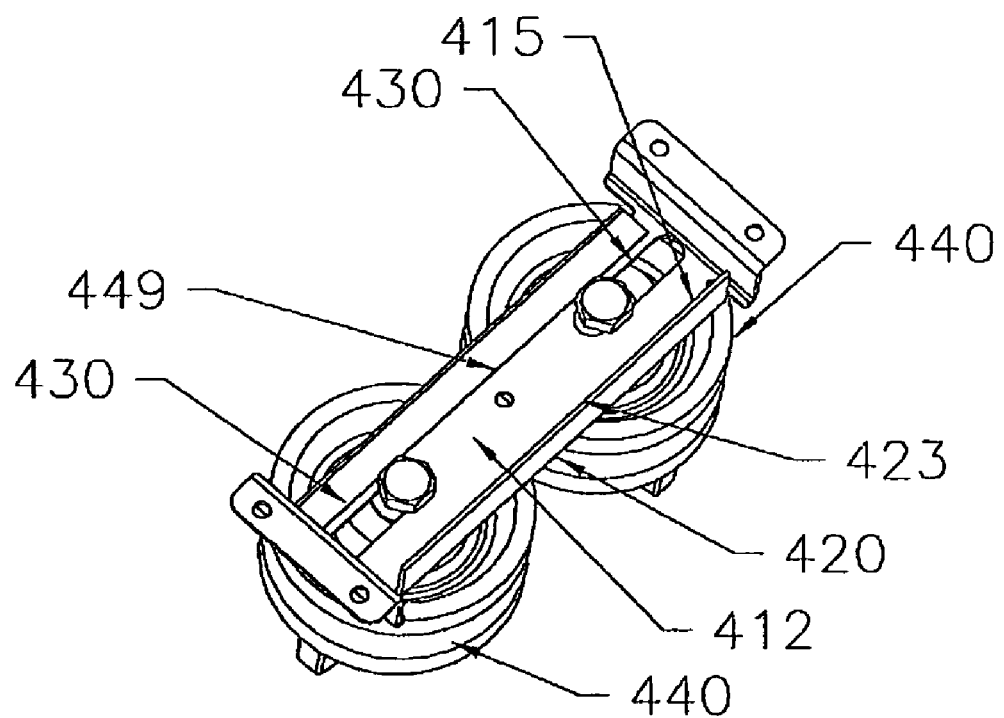
FIG. 5 is a perspective view of a roller assembly and roller assembly mounting bracket that is part of the apparatus.

The cable/bundle output (exit) area 130 of the apparatus 100 includes a roller assembly 400 that is located at an opposite end relative to the end plate 140 and is the location where the conduit 170 terminates at the second end 174. As shown in FIGS. 2 and 5, the roller assembly 400 includes a mounting surface or member 410 that is securely attached to a substrate or mounting surface (e.g., the same surface to which the end plate 140 is attached). The mounting member 410 includes a base section 412 and a mounting portion 414 which is securely attached to the substrate (mounting surface). In the illustrated embodiment, there are two mounting portions 414 located at each end of the base section 412. Each mounting portion 414 can be in the form of a mounting bracket or the like that can be attached to the substrate using fasteners (e.g., bolts) or the like.

As shown in FIG. 5, the base section 412 has a mounting surface 420 and can include a flange 415 that ensures that the mounting surface 420 is slightly raised relative to the substrate. A space is formed below an underside 423 of the mounting surface 420 and the substrate when the roller assembly 400 is securely attached to the substrate. This space receives and contains fastener components as described below.

The base section 412 includes a pair of slots 430 that allow for adjustment of a pair of rollers 440. For example, the slots 430 can be formed in the base section 412 near its ends where the mounting brackets 414 are located. The slots 430 can be formed in any number of different shapes and sizes so long as they permit proper repositioning of the rollers 440.

Figure 10A:
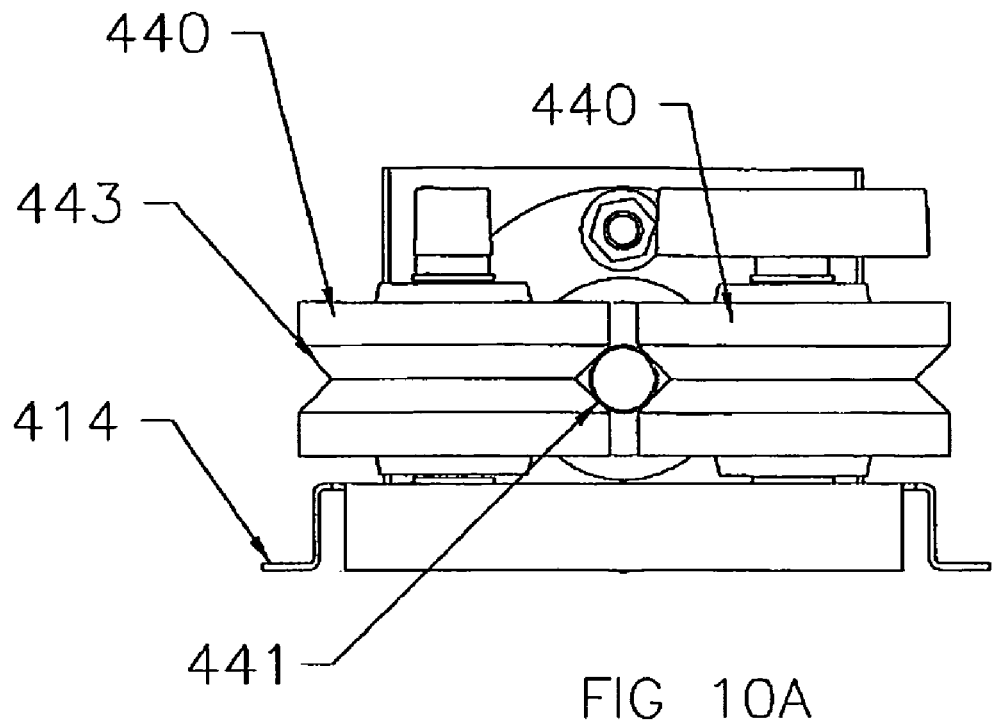
FIG. 10A is an end elevation view of the apparatus illustrating the adjustable roller assembly.
Figure 10B:
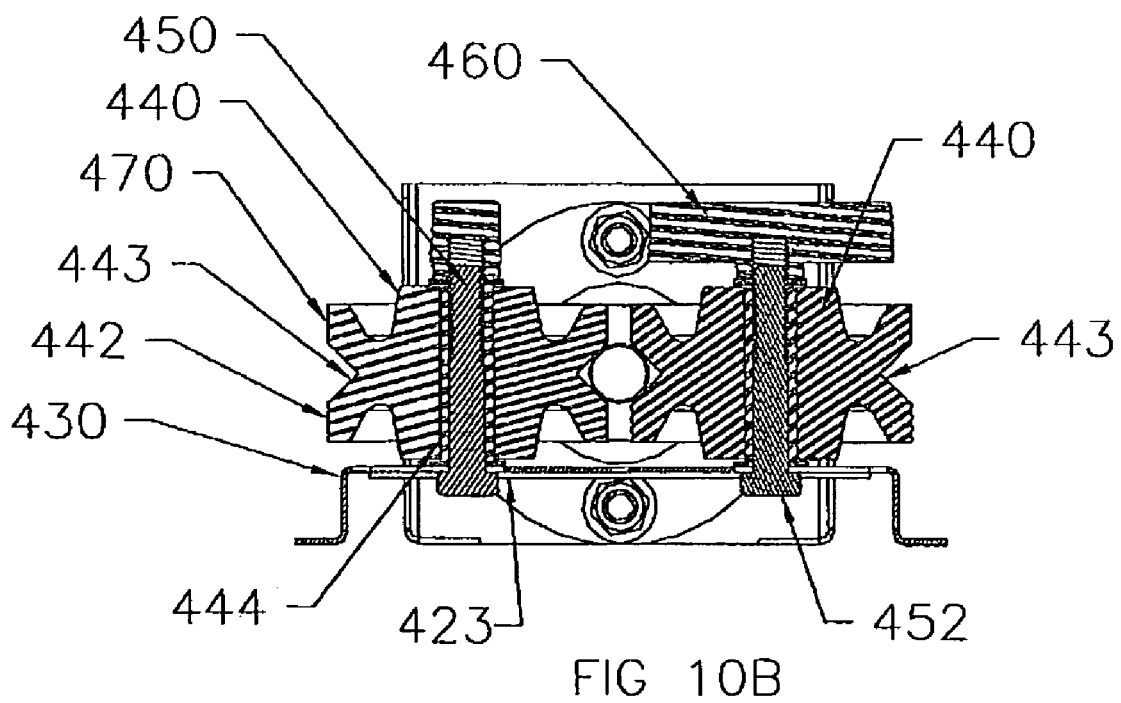
FIG. 10B is a cross-sectional view of the adjustable roller assembly.

As shown in FIGS. 10A and 10B, the rollers 440 are disposed along a top surface 421 of the mounting surface 420 and in particular, the rollers 440 are mounted to shafts 450 about which the rollers 440 rotate. Each roller 440 has a circular shaped body 442 and a central shaft opening 444 through which the shaft 450 extends. Each roller 440 is disposed sideways relative to the top surface 421 of the mounting surface 420. In other words, the rollers 440 are disposed horizontally relative to the top surface 421. The base section 412 includes an opening through which the shaft 450 extends and is permitted to extend through the central shaft opening 444 of the body 442. A head 452 of the shaft 450 (e.g., a bolt) is disposed through the slot 430 and against the underside 423 of the base section 420 and at an opposite end 454 of the shaft 450, a member 460 (e.g., a threaded knob or handle) is disposed and securely attached to the end 454 to cause the roller 440 to be held in place, while still permitting free rotation of the roller 440. For example, the shaft 450 and member 460 can be part of a screw tightening handle assembly.

Since the shaft 450 is mounted through the slot 430 which is elongated in shape, the shaft 450 can be located in different positions within the slot 430 to allow repositioning of the roller 440 relative to the mounting member 410. The rollers 440 can thus be brought closer together or further apart from one another.

The two horizontally mounted rollers 440 are located so that they are disposed side-by-side with a small space 441 being formed between the rollers 440. As described below, it is through this space 441 that the sleeve and bundle assembly passes. Each roller 440 has a diametric (contact) surface 470 which contact the sleeving 300 that surrounds the conduit 170. Instead of being a purely cylindrical roller, the contact surface 470 of the roller 440 has a V-shaped groove 443. As best shown in FIGS. 10A and 10B, the V-shaped groove 443 is located in the middle of the contact surface 470. There are at least two reasons for the inclusion of the V-shaped groove 443. First, the V-shaped groove 443 allows the rollers 440 to locate the conduit (tube) 170 in an exact position. Purely cylindrical rollers allow for perpendicular translation of the conduit 170; however, this translation has a detrimental effect on the tension at the point where the sleeving 300 and bundle 200 are applied together, and are not acceptable. Second, the V-shaped groove 443 does not have a purely tangential interface with the sleeving 300 as it contacts the rollers 440. The result is a minor amount of friction between the roller 440 and the sleeving 300. This friction prevents the rollers 440 from freewheeling and paying out the sleeving 300 when not being actively pulled onto the bundle 200. This friction also causes the sleeving 300 to be pulled axially and therefore reduces the sleeving diameter to comply with the bundle diameter as close as possible.

The rollers 440 are preferably urethane rollers. The urethane material that is used on the surface of the roller 440 is soft enough to not molest the braided sleeve material 300. This is important because any marring or cutting of the sleeving 300 will likely cause the sleeve's partial or full disintegration.

The rollers 440 rotate during operation about an axis that is perpendicular to the mounting surface 420. The base section 412 also includes a folded hem 449 shown in FIG. 5 that prevents the head 452 of the shaft (bolt) 450 from taming (i.e., loosening of the rollers 440).

In accordance with the present invention and as briefly described above, the rollers 440 are adjustable for different center to center spacings. This adjustability performs two functions, namely, it allows for coarse adjustment to allow for the various diameters of the conduits 170 and for fine adjustment for setting the friction between the roller 440 and the sleeving 300. The adjustability can be performed in a number of different manners. The operator can manually position the rollers 440 by employing the sets of slots 430 and screw tightening handles, allowing the operator to adjust the spacing and friction by hand. Alternatively, the rollers 440 can be part of an automated system that allows for automatic positioning and repositioning of the rollers 440. For example, the rollers 440 can be biased so as to tension and position the rollers 440 automatically. In this arrangement, a number of springs and pivots are arranged to tension and position the rollers 440 automatically. The above adjustability permits different diameter conduits 170 that allow for varied bundle sizes/flex sizes.

As shown in FIGS. 10A and 10B, the side-by-side positioning of the rollers 440 and the two facing V-shaped grooves 443 define the space 441 into which the second end 174 of the conduit 170 is disposed. As best shown in FIG. 3, the second end 174 of the conduit 170 is positioned in the space 441 between the two rollers 440 so that the point where the bundle 200 exits the conduit 170 and meets the sleeving 300 is located between the two rollers 440.

As shown in FIG. 6, the apparatus 100 can be bench mounted or board mounted. FIG. 6 shows a support surface in the form of a table and in one embodiment, the apparatus 100 is permanently mounted to the table by directly mounting the end plate 140 and the mounting member 410 to the table. Alternatively, the end plate 140 and the mounting member 410 can be part of a portable system where they are mounted to a board that is then clamped to the table.

The length of the conduit 170 can be varied to allow for more or less flex sleeving 300 to be installed. The conduit 170 to sleeving nominal ratio does have an affect on how much of the compressed (expanded) sleeve 300 can be held. This is due to the amount of "bunching" and/or "overlapping" that naturally occurs during the compression of the raw sleeve 300.

As shown in FIG. 4, the apparatus 100 can fit a number of different diameter conduits (tubes) 170 allowing for a range of different sleeving 300 to be applied. The conduits 170 are mounted to a quick change flange system (mounting flange 150 and adapter 160) which allows the conduits 170 to mate to the same bolt pattern for each conduit 170. This allows the apparatus 100 to be easily configured for a number of different sleeving and bundle combinations.

Figure 7:
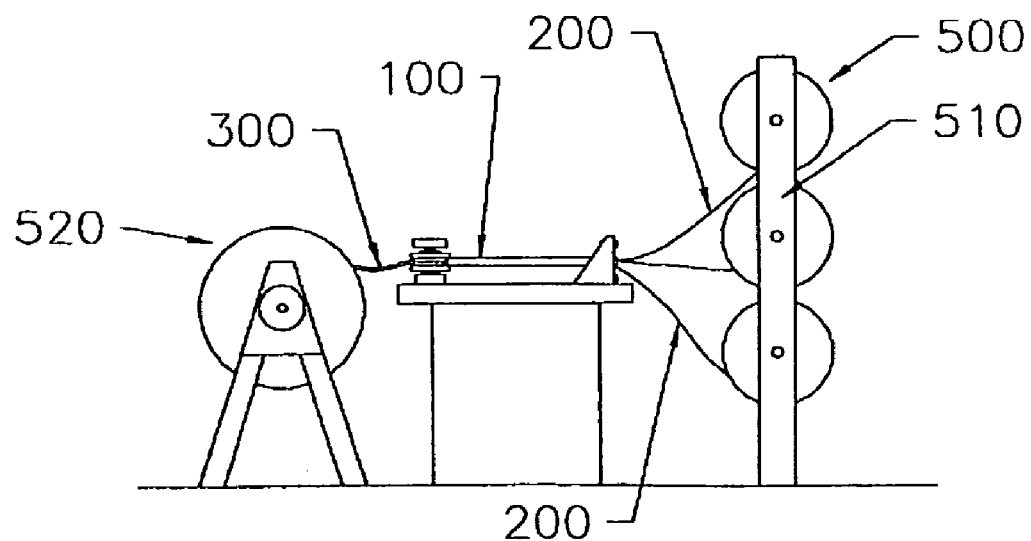
FIG. 7 is a side view of the apparatus in combination with commonly available cable payout equipment and cable take-up equipment.
Figure 8:
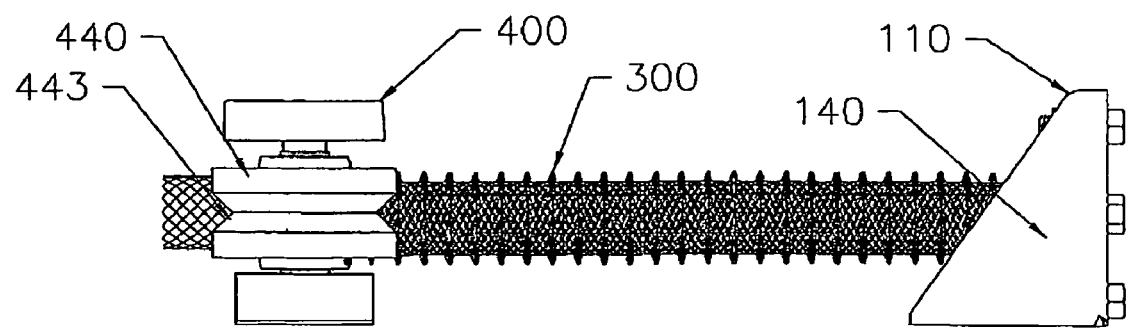
FIG. 8 is a cross-sectional view of the apparatus showing flexible expandable braided sleeving axially compressed onto an elongated conduit of the apparatus.
Figure 9:
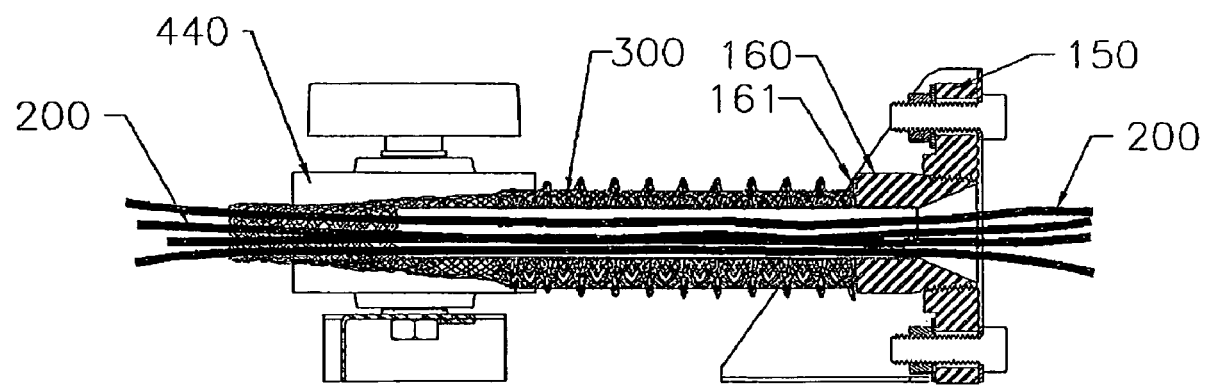
FIG. 9 is a cross-sectional of the apparatus with a cable bundle being pulled through the conduit, flexible expandable braided sleeving being axially compressed on the tube and the cable and sleeving meeting at the exit as the sleeving is applied to the cable bundle.

FIGS. 7-9 illustrate a typical setup of the apparatus 100. FIG. 7 shows the apparatus 100 mounted to a table (support) member 101 with the cable/bundle input area 110 being positioned along one end of the member 101 and the cable/bundle output (exit) area 130 being positioned along the other end of the member 101. At the cable/bundle input area 110, a typical setup includes spools 500 of raw un-terminated cable sitting on a payout rack 510 or some other location/mounting which will allow the individual wires to come together and form the bundle, to accomplish, then spools 500 need to roll freely to dispense the cable 200. At the opposite end of the table 101, a take-up reel 520 or the like can be provided for managing the assembled sleeving 300 and bundle 200. This payout/take-out system is not necessarily to the operation of the apparatus 100, however, it helps because the assembled cable/sleeve can get heavy and unruly. The take-up system 520 can optionally employ other features such as length counters and assembly cutting system.

As shown in FIG. 8, a method of applying the sleeving 300 to the member 200 (cable) begins by the operator pulling the expandable sleeving 300 over the second end 174 of the conduit 170 past the rollers 440 and pulled all the way to the back side of the front (funnel) end 172. As shown in the FIG. 9, a shoulder 161 is formed between the adapter 160 and the conduit (tube) 170. The shoulder 161 thus creates a stop at the first end 172 of the conduit 170. The sleeving 300 is thus slid over the outer surface of the conduit 170 to the shoulder 161 which permits the sleeving material to bunch up into its expanded condition. The sleeving 300 in its compressed state can be referred to as "compressed sleeving" or a "sleeve bunch." The operator can place as much sleeving 300 onto the conduit 170 as needed or the operator can opt to put on as much sleeving 300 as the conduit 170 can hold. It will be appreciated that this amount of sleeving material varies by factors such as tube length, tube diameter, flex sleeve nominal diameter and the flex sleeve material. The bunching up process is continued until a certain length of the sleeving 300 is bunched up and in one application, the sleeving 300 is bunched up until the end of the sleeving 300 overhangs the butt end (second end 174) of the conduit 170 by about an inch or so it is time to stop putting the sleeving 300 onto the conduit 170 ("bunching").

The operator then selects the required wires/cables 200 for the bundle assembly and feeds them together into the cable entry end (input area 110) of the apparatus 100. The required wires/cables are thus fed into the tapered section 163 of the central opening 161 which leads to the reduced diameter section 167. This feeding continues until the wires emerge out of the butt end (second end 174) of the conduit 170 by about an inch or other desired un-sleeved length. It will be appreciated that the above feeding specifications are merely exemplary and both the wires and sleeving can extend other distances from the second end 174.

At this point, the operator at the cable exit end (cable/bundle output (exit) area 130), pulls both the end of the expandable sleeving 300 and the bundle of wires 200 at the same time. As mentioned above, the area 130 is the point where the sleeving 300 and the bundle 200 meet. The rollers 440 regulate the speed at which the sleeving 300 is released from the outside of the conduit 170 where it has been held in compression (expanded state). If the rollers 440 were not present, the expanded sleeving 300 would be laid over the bundle 200 in a very uneven fashion. The regulation provided by the rollers 440 is very important to the final fit between the sleeving 300 and the bundle 200. The rollers 440 thus ensure that the sleeving 300 is released from its expanded state (compressed) and laid over the bundle 200 in an even manner that results in the sleeving 300 being applied to the outer surface of the bundle 200. As mentioned above, the groove 443 does not have a purely tangential interface with the sleeving 300 as it contacts the rollers 440 and the result is a minor amount of friction between the roller 440 and the sleeving 300. This friction causes the sleeving 300 to be pulled axially and therefore reduces the diameter to comply with the bundle diameter as close as possible as shown in FIGS. 10A and 10B.

The take-up reel 520 can be part of a take-up system that is designed to receive and manage the combined sleeving 300 and bundle 200. It will be appreciated that the take-up system is not required since the operator can hand pull the cable 200 to the desired length by simply walking away from the apparatus 100 while holding the new bundle/sleeve assembly. The wire (bundle 200) and expandable sleeve 300 is now very easily married together and ready for cutting to length and/or shipping or termination. The take-up reel 520 is helpful in the instance of when the assembled cable/sleeve becomes heavy and unruly or in minimizing the space needed to apply sleeving to a bundle. The sleeving/bundle assembly can then be cut or otherwise processed.

When using large amounts of sleeving 300, it is advantageous to manage the bunched up sleeving 300, keeping its position as close to the roller wheels 440 as possible. This is due to the fact that when pulling out the assembly (sleeving/cable), the material can become static on the tube (conduit 170) and while being pulled, the diameter is automatically reduced when the axial compression is removed. This reduction of diameter may, in some cases, cause binding between the inside of the sleeving 300 and the conduit 170. To prevent this binding occurrence, a biased shuttle 600 shown in FIG. 11 can be positioned behind the bunch. For example, a spring biased shuttle 600 can be positioned behind the bunch. This spring loading keeps the bunch pushed to the roller wheels 440.

Figure 11:
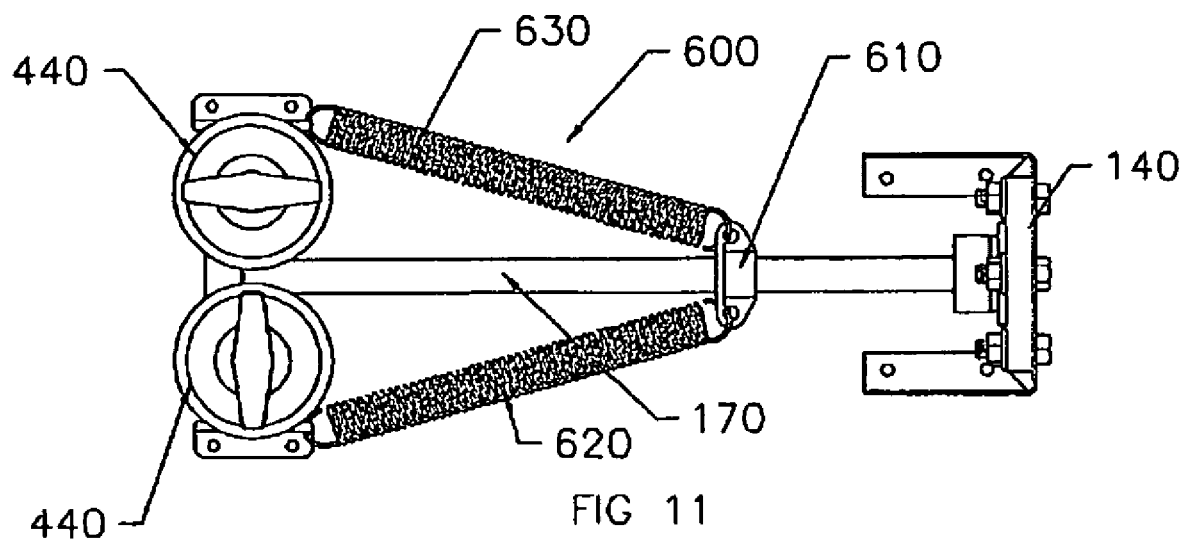
FIG. 11 is a side elevation view of the apparatus with an optional spring-loaded shuttle for the sleeving.

As shown in FIG. 11, the shuttle 600 includes a body 610 that moves longitudinally along the conduit 170 and is biased against the bunch by means of a biasing mechanism 620. In the illustrated embodiment, the biasing mechanism 620 includes a pair of springs 630 that are coupled at first ends to the body 610 and are coupled at opposite second ends to the mounting member 410. As the shuttle body 610 is moved towards the end plate 140, the springs 630 extend and store energy and this stored energy is applied to the end of the bunch to cause it (the compressed sleeving 300 (FIG. 9)) to be driven toward the rollers 440. When a new sleeving 300 is inserted on and fed along the conduit 170 and is bunched, the body 610 is driven toward the end plate 140 to cause the springs 630 to store energy.

In addition, the rollers 440 can be motor driven. This allows for automatic loading of the flexible sleeving 300 onto the conduit 170. This can be advantageous when using long length sleeves 300 and conduits 170. This can also assist in paying out the sleeving 300 in an automated version of the apparatus 100.

In yet another embodiment, the conduit 170 can have a bent shape. For example, the conduit 170 can have a 180 degree, large radius bend in the conduit 170. This permits a single operator to stand at the loading (input area 110) and the payout end (exit area 130). This reduces the number of possible operators and reduces the operating time by being in two places at once. It will be appreciated that a support member can be provided at the apex of the bend of the conduit 170.

The present invention thus provides a solution to the need in industry for an apparatus and method for cost-effectively, efficiently, easily and reliably applying sleeving to individual or bundles of wires, cables, hoses, tubing, flexible actuators and like materials and devices.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. An apparatus for applying a flexible, expandable sleeving over an elongated structure comprising:
    a first section for receiving the elongated structure;
    an elongated hollow conduit that receives the elongated structure within a hollow interior space thereof, the conduit having an outer surface for receiving the sleeving and permitting the sleeving to be stored along the outer surface in a compressed, bunched state; and
    a second section that includes a pair of rollers that are disposed about one end of the conduit and are configured so that they contact the sleeving as it is paid out onto an outside of the elongated structure and prevent the compressed sleeving from suddenly releasing its stored energy and self-ejecting off of the conduit as the sleeving and elongated structure are mated and are moved away from the rollers, wherein the rollers are located such that the sleeving contacts the rollers before the sleeve contacts the elongated structure.

2. The apparatus of claim 1, wherein the sleeving comprises a braided flexible sleeving and the elongated structure comprises one of a wire, cable, hose, tube, flexible actuator and bundles thereof.

3. The apparatus of claim 1, the pair of rollers are rotatably and adjustably mounted to a support in such a way that they can be adjusted for different center to center spacings.

4. The apparatus of claim 1, wherein the one end of the conduit is disposed between the rollers but does not extend beyond the rollers so that the expandable sleeving and the elongated structure are joined together at a location between the rollers so that the rollers contact the outer surface of the sleeving as it is released from the outer surface of the conduit and alter a speed at which the sleeving is released onto the elongated structure.

5. The apparatus of claim 1, wherein a contact surface of each roller includes a V-shaped groove, the rollers being arranged side-by-side so that the V-shaped grooves face one another and define a space that receives the one end of the conduit.

6. The apparatus of claim 5, wherein the orientation of the V-shaped grooves create more than two points of contact between the sleeving and the conduit, thereby creating friction to keep the rollers from freewheeling.

7. An apparatus for applying a flexible, expandable sleeving over an elongated structure comprising:

a first section for receiving the elongated structure;

an elongated hollow conduit that receives the elongated structure within a hollow interior space thereof, the conduit having an outer surface for receiving the sleeving and permitting the sleeving to be stored along the outer surface in a compressed, bunched state; and a second section that includes a pair of rollers that are disposed about one end of the conduit and are configured so that they contact the sleeving as it is paid out onto an outside of the elongated structure and prevent the compressed sleeving from suddenly releasing its stored energy and self-ejecting off of the conduit as the sleeving and elongated structure are mated and are moved away from the rollers, wherein the first section includes an end plate that fixedly retains one end of the conduit and an adapter that is coupled to the end plate by means of a mounting flange, the adapter having a bore that has a variable diameter and includes an inwardly tapered inlet end for receiving and directing the elongated structure into the hollow interior space of the conduit.

8. The apparatus of claim 7, wherein the bore has a uniform diameter section that receives and retains one end of the elongated structure, the uniform diameter section being at an end opposite the inwardly tapered inlet end.

9. The apparatus of claim 8, wherein the adapter is detachably coupled to the mounting flange to permit removal of the elongated structure and replacement with a different elongated structure, the mounting flange also being detachably coupled to the end plate.

10. The apparatus of claim 7, wherein the conduit comprises a tube.

11. An apparatus for applying a flexible, expandable sleeving over an elongated structure comprising:

a first section for receiving the elongated structure;

an elongated hollow conduit that receives the elongated structure within a hollow interior space thereof, the conduit having an outer surface for receiving the sleeving and permitting the sleeving to be stored along the outer surface in a compressed, bunched state; and a second section that includes a pair of rollers that are disposed about one end of the conduit and are configured so that they contact the sleeving as it is paid out onto an outside of the elongated structure and prevent the compressed sleeving from suddenly releasing its stored energy and self-ejecting off of the conduit as the sleeving and elongated structure are mated and are moved away from the rollers;

wherein the pair of rollers are rotatably and adjustably mounted to a support in such a way that they can be adjusted for different center to center spacings, wherein shafts about which the rollers rotate pass through slots formed in the support, a length of the slots defining the degree of adjustability.

12. The apparatus of claim 11, wherein the rollers rotate about axes that are at least substantially perpendicular to the support and to a longitudinal axis of the conduit.

13. The apparatus of claim 11, wherein the rollers are mounted in a spring loaded manner to permit adjustability to accommodate different dimensioned conduits.

14. An apparatus for applying a flexible, expandable sleeving over an elongated structure comprising:

a first section for receiving the elongated structure;

an elongated hollow conduit that receives the elongated structure within a hollow interior space thereof, the conduit having an outer surface for receiving the sleeving and permitting the sleeving to be stored along the outer surface in a compressed, bunched state;

a second section that includes a pair of rollers that are disposed about one end of the conduit and are configured so that they contact the sleeving as it is paid out onto an outside of the elongated structure and prevent the compressed sleeving from suddenly releasing its stored energy and self-ejecting off of the conduit as the sleeving and elongated structure are mated and are moved away from the rollers; and a biased shuttle device that applies a force to one end of the compressed expandable sleeving in a direction toward the rollers to ensure continuous feeding of the sleeving to the rollers.

15. The apparatus of claim 14, wherein the shuttle device includes a pair of springs that are attached at one end to the shuttle device and at another end to a support on which the rollers rotate.

16. A system for applying a flexible, expandable sleeving over an elongated bundle of items comprising:

an inlet section for receiving the items and directing them together to form a bundle;

an elongated hollow conduit that receives at a first end the bundle within a hollow interior space thereof and includes an outer surface for receiving and permitting the expandable sleeving to be compressed and bunched up along the outer surface; and an outlet section that includes a pair of rollers that are disposed about an opposite open second end of the conduit, with the open second end being located between the rollers, the rollers being configured so that they contact and alter the speed at which the sleeving is paid out onto an outside of the bundle as both are moved away from the rollers, wherein the two rollers rotate about axes that are at least substantially perpendicular to a longitudinal axis of the conduit and are configured to provide more than two points of contact between the sleeving and the conduit.

17. The system of claim 16, further including a stop being associated with a first end of the conduit proximate the inlet to permit the sleeving to be compressed and bunched and held in compression along the outer surface thereof.

18. The system of claim 16, wherein the second end of the conduit is located relative to the rollers such that as the bundle is axially inserted into the hollow space, the rollers release the sleeving onto the bundle resulting in a reduction in a diameter of the sleeving and an intimate fit between the sleeving and the underlying bundle.

19. The system of claim 16, wherein the rollers are operatively coupled to a motor to provide automated payout of the sleeving onto the bundle.

* * * * *